United States Patent

Molho

[15] 3,653,042

[45] *Mar. 28, 1972

[54] DIGITAL SIGNAL-PROCESSING SYSTEM

[72] Inventor: Fred Molho, 12 Rue de la Marseilleise, Paris 19, France

[ * ] Notice: The portion of the term of this patent subsequent to May 28, 1985, has been disclaimed.

[22] Filed: Feb. 27, 1968

[21] Appl. No.: 708,537

Related U.S. Application Data

[63] Continuation of Ser. No. 376,883, June 22, 1964, Pat. No. 3,386,077.

[52] U.S. Cl. ....................................... 343/5 DP, 343/17.1 R
[51] Int. Cl. ........................................................ G01s 9/00
[58] Field of Search ....................................... 343/50 P, 17.1

[56] References Cited

UNITED STATES PATENTS

| | | | |
|---|---|---|---|
| 3,307,184 | 2/1967 | Poterack et al. | 343/17.1 |
| 3,386,077 | 5/1968 | Molho | 340/146.1 |

*Primary Examiner*—Richard A. Farley
*Attorney*—Karl F. Ross

[57] ABSTRACT

In a radar installation or the like, incoming multidigit signals are registered in a memory having as many stages as there are digital positions in a signal. In order to discriminate against parasitic signals, correspondingly positioned digits of an incoming signal and a preceding signal already registered in the memory are compared; to compensate, however, for unavoidable delays in the registration of each incoming digit, the digits of the preceding signal are read out from memory stages that are staggered with reference to the stages in which the incoming digits are concurrently inscribed, the offset between the inscribed and the readout stages being equal to M<N where N is the total number of stages. Advantageously, M is chosen to provide a readout delay equaling the time lag introduced by the recording equipment in the inscribing operation; in certain instances, however, the delay may be chosen to exceed the time lag.

1 Claims, 7 drawing Figures

FRED MOLHO
INVENTOR

FRED MOLHO
INVENTOR

FRED MOLHO
INVENTOR

FRED MOLHO
INVENTOR

FRED MOLHO
INVENTOR

DIGITAL SIGNAL-PROCESSING SYSTEM

This application is a continuation of my application Ser. No. 376,883 filed 22 June 1964 and now U.S. Pat. No. 3,386,077.

This invention relates to digital information-processing systems of the type in which the information to be processed is applied to the system in the form of one or more trains of recurrent information signals, each signal containing a plurality of pulses in sequential digital positions of the signal, the digital pattern of the pulses providing desired information in some predetermined code.

An especially important but by no means exclusive example of a field in which such systems are used is that of radar, in which case the information signals referred to would be echo or response signals received from aircraft, either as direct reflections therefrom or as response signals from a transponder aboard the craft.

In systems of this general kind it is usually desired to compare the information content of adjacent signals of the, or each, train received. Thus, it may be desired to compare, bit by bit, the contents of two adjacent signals of a train and reject any digit of the later signal not present in the earlier signal as being due to a stray echo or other parasitic cause. Of course, should the digit persist in the next signal after that, it would be retained as properly indicative of a variation in the information being conveyed. This type of operation obviously requires successive signals to be memorized.

Such a system must therefore include a memory register having a plurality of memory elements (e.g. ferrite cores) corresponding in number to that of digital positions in a signal, say 512 in one practical application. Each signal applied to the input of the system has its digits recorded in respective elements of the memory register. The recording operation necessarily involves a time lag, primarily due to the need for positionally quantizing or digitizing the pulses of the incoming signal before they can be recorded. The echo pulses occur at random times within the signal period, whereas digitized pulses derived therefrom must be recorded in the memory at accurately fixed instants of time.

Owing to this unavoidable time lag between the instant of reception of an incoming signal digit and the instant it is recorded in the memory, it has normally been impossible to compare directly the digits of an incoming signal with those of a memorized earlier signal, since each incoming signal digit would be over by a number of pulse positions (a number corresponding to the recording time lag) by the time the correspondingly positioned digit of the previous signal could be read out from the memory and made available for the desired comparison. Only previously recorded signals could be compared. This has resulted in a loss of response time highly objectionable in modern fast-response radar equipment.

It is a main object of this invention to eliminate this limitation of conventional digital signal-processing system of the specified type in an effective way and thus to increase the response rate thereof without introducing any complications in the equipment.

Three methods are conceivable in theory for enabling a direct, "real-time", comparison between the digits of an incoming signal and the corresponding digits of a memorized earlier signal. One is to provide for an extremely fine quantizing or digitizing action so as to reduce the recording time lag to a value so small that direct comparison is made possible without substantial loss of information. This is extremely difficult to achieve in practice and unacceptably increases the amount and expense of the equipment. Another method is to delay the incoming signal digits by an internal corresponding to the recording lag. This solution is attractive owing to its simplicity and has been disclosed in commonly owned French patent No 1 358 553 filed on 5 March 1963. This method, though convenient, is only a partial solution to the problem, since while it enables direct comparison with the incoming signal digits in what is almost (but not quite) real time, a certain delay must be deliberately introduced.

The present invention makes use of a third method which provides a complete theoretical solution to the problem of real-time compansion between digital signals of an incoming signal train, while yet retaining a simple and low-cost system. In accordance with the method of this invention, the sequential digits of each incoming signal are recorded ; the recorded digits are read out ; and the recording and read-out processes are so timed in relation to one another that each recorded digit is read out substantially simultaneously with the recording of a digit having a position in the incoming signal that precedes, by a prescribed amount of lead, the position of the first-mentioned digit in the recorded signal.

In an especially useful aspect of the invention, the said amount of lead is selected to be equal to the known recording time lag. Each digit of the recorded signal will then be read out in time to be made available for comparison with the correspondingly positioned digit of the incoming signal, and true real-time comparison is made possible.

However, in accordance with other objects of the invention, it is envisaged that the "read-lead" feature forming the essential characteristic hereof can in certain circumstances be used for taking advance decisions relating to the incoming signals, and for such purposes the amount of reading lead may be selected substantially greater than the recording lag, as will be later made clearer.

Further objects of the invention relate to the provision of memory systems possessing the improved read-lead feature specified including a plurality of memory registers for memorizing several earlier signals, the digital contents of the registers being transferred from one to the next register in time with the recording and reading-out of the digits. Such a multi-register system may have various uses, as for comparing more than two, i.e. three or more, successive signals of a received signal train, and/or in cases where more than one train of information signals is being received, e.g. two, three or more interleaved signal trains with the signals in each train being similarly coded to convey information of comparable meaning, different from the information conveyed by the signals of each of the other trains. Such a situation is present, in particular, in the case of secondary or so-called IFF radar systems, for "de-fruiting" operations and the like.

It is a further object of the invention to provide digital signal-processing systems having improved anticipatory memory read-out means as described above and having further provision for restoring the information that would otherwise tend to be lost at the start of each signal cycle owing to the lead in digit read-out.

The above and further objects, aspects and features of the invention will be made clear from the ensuing particular disclosure relating to specific embodiments of the invention selected by way of example but not limitation and illustrated in the accompanying drawing wherein.

Figures 2, 2A:
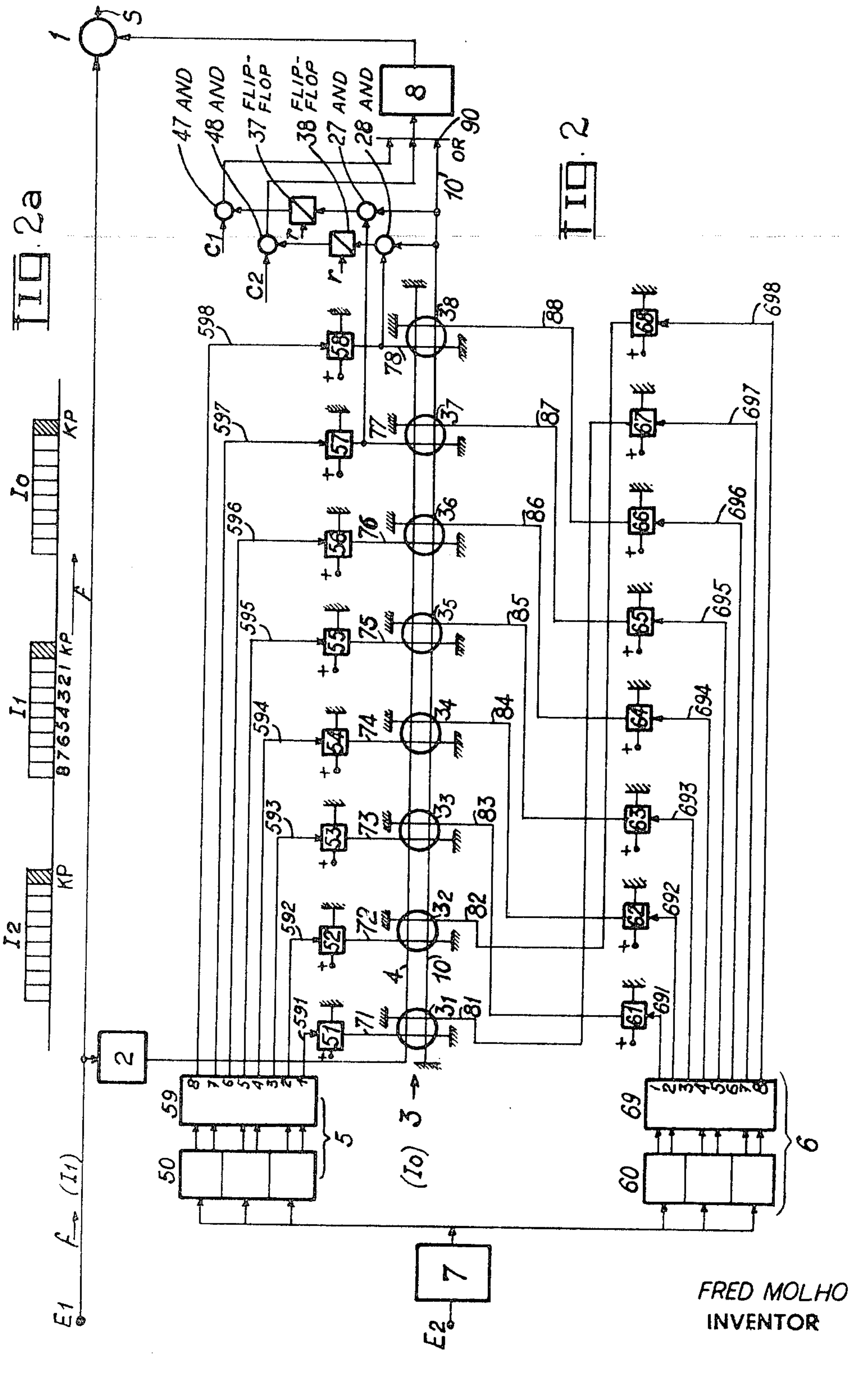
FIG. 2 is a detailed schematic of a simple embodiment of the invention using a single memory register.
Figure 3:
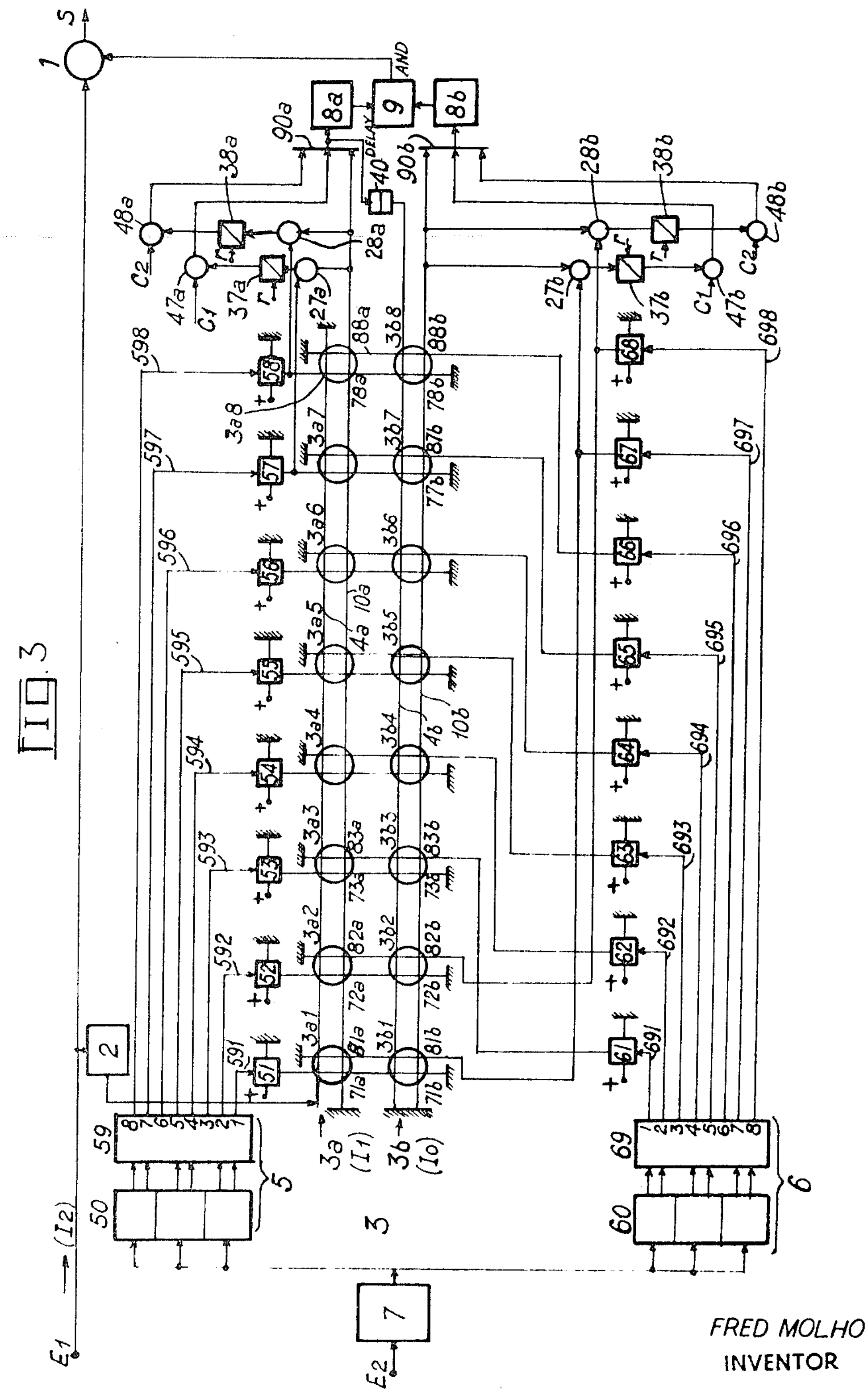
Figures 4, 4A:
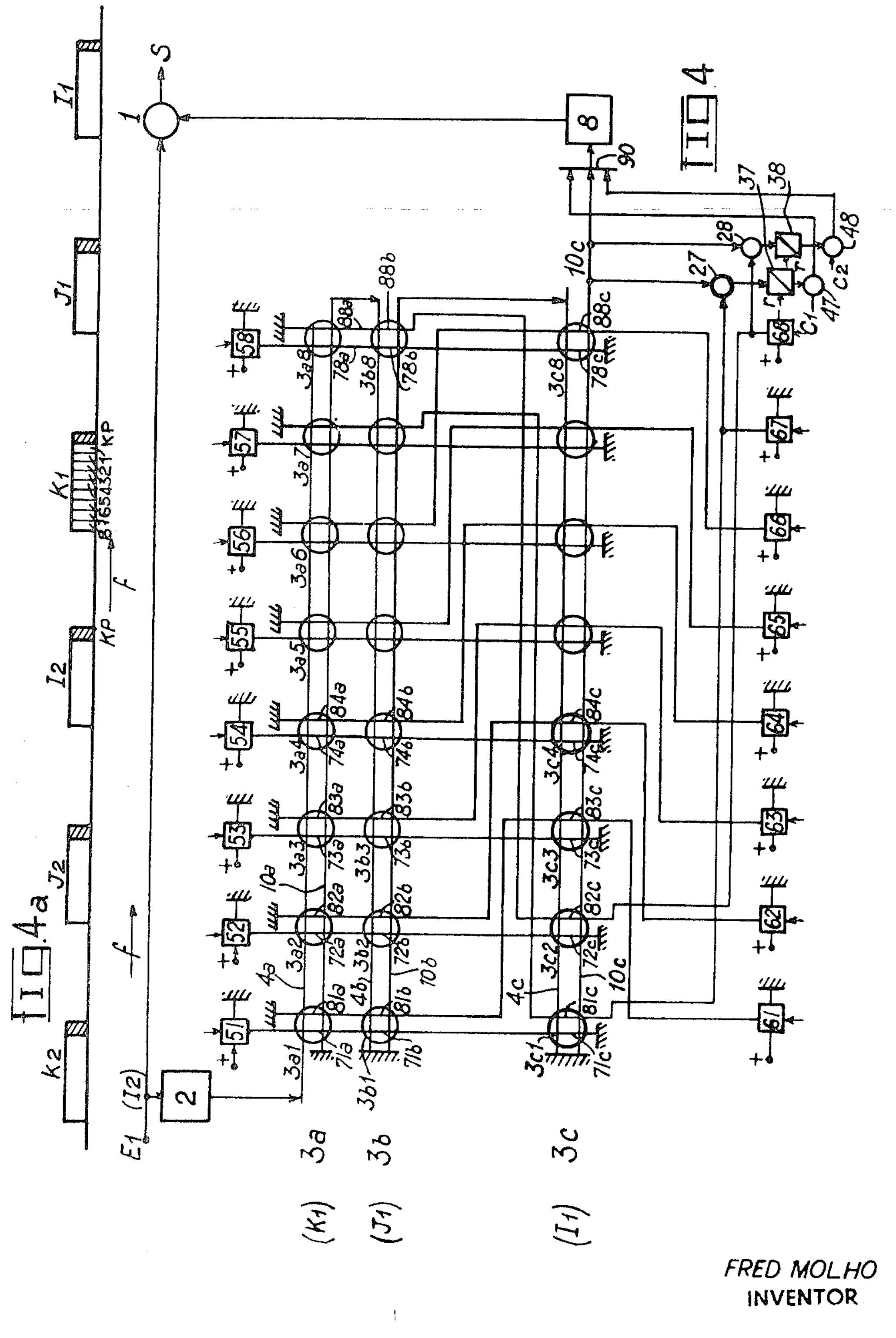
Figure 5:
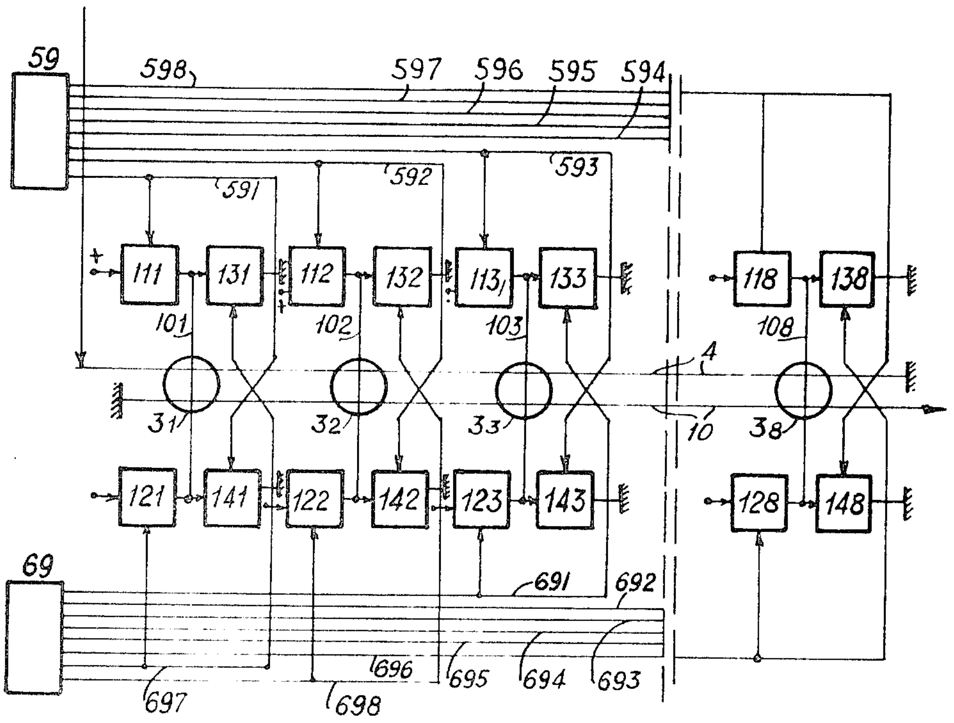

FIG. 2*a* is a pulse diagram serving to represent the type of signal train processed in the systems of FIGS. 2 and 3;

FIG. 3 is a schematic similar to FIG. 2 relating to another embodiment using two memory registers ;

FIG. 4 is a similar schematic, partly illustrating another embodiment using three memory registers ;

FIG. 4*a* is a pulse diagram showing the type of signal trains processed in the system of FIG. 4 ; and FIG. 5 is a fragmentary schematic illustrating a modification of record- and read-address means applicable to any of the embodiments of the invention shown in the preceding Figures.

Figure 1:
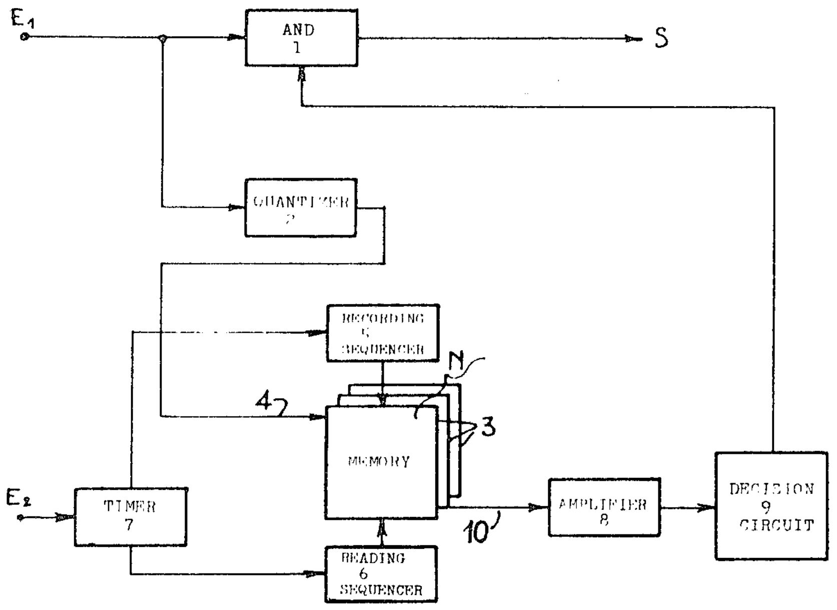
FIG. 1 is a general block diagram used to describe the principles of the invention in broad outline.

The invention will first be outlined with reference to FIG. 1. The system there shown in functional block form has an input $E_1$ which may be assumed to be connected to the video-signal output of a pulsed radar system of any conventional type using recurrent trains of signals. The input signals from $E_1$ are passed in a direct path to one input of a two-input output AND-gate 1 whose output constitutes the output line S from the system as will later appear.

The input signals from $E_1$ are simultaneously applied to a conventional quantizer or digitizer circuit 2 in which they are converted into digital pulses ; this digitizing action can be comparatively crude. The digital input signals are then recorded in a digital form by way of a recording line 4 in a memory system 3. The memory system 3 is here shown as a multi-register matrix array, each register being in the form of a plane matrix of two-state memory elements such as ferrite cores or any other of the miniature two-state devices currently available for such purpose. While the memory system used according to the invention may include a plurality of memory registers, for instance the three shown, for reasons that will later appear, this is not essential and the invention can well be embodied in a system using a single memory register. The number N of stages in each such register corresponds to the number of binary-code pulse positions present in each of the received recurrent signals. By way of example, in a practical application of the invention the radar system involved employed recurrent signals each about 4 milliseconds in duration, and each signal was composed of 512 binary-code pulse positions, each of which consequently was somewhat under 8 microseconds in width. In that case each of the memory registers 3 was constituted as a rectangular matrix of 512 ferrite cores, suitably wired to permit the recording of the binary information digits serially in all the cores of the register. In the ensuing description it will first be assumed for clarity that the memory array 3 includes but a single multi-stage register rather than the three shown.

The memory register 3 has a recording line 4 connected to the output of digitizer 2 and inductively associated with all of the stages of the register, as by being threaded in the conventional manner serially through all the ferrite cores thereof. The register 3 further has a reading line 10 associated with all of its stages, as by being threaded serially through all the ferrite cores, and connected with the input of an amplifier and shaper circuit 8. Recording address circuitry 5 is provided, having an input connected to the output of a clock circuit or timer 7, and having its outputs (here shown for simplicity as a single output line) connected to all of the N stages of the register so as to condition them sequentially for the recording therein of an information digit applied thereto by way of the recording line 4, in generally conventional fashion.

The clock circuit 7 is controlled from a second input $E_2$ of the system which is connected to receive the usual synchronizing or keying pulses associated with the start of each signal received at input $E_1$.

Similarly, read address circuitry 6 is provided, with an input connected to the output of clock circuit 7 and with outputs (here shown for simplicity as a single output) connected to all of the stages of the register so as to condition them sequentially to read out the information digit present therein by way of the read-out line 10, in generally well-known fashion. The read-out signals present on line 10, after amplification and shaping in circuit 8, may optionally be passed through a logical decision circuit 9 later discussed and are thence applied to the second input of the output AND-gate 1.

As so far described the system operates in the following way.

During reception of a given one of the recurrent signals appearing at $E_1$, it will be understood that the memory register 3 initially has its several (e.g. 512) stages in respective binary states as determined by the code-information content present in the signal that immediately preceded the one being currently received. In other words, the over-all binary state of the register elements represents the code content of said preceding signal. As the code pulses of the signal being currently received are applied sequentially, after digitization in digitizer 2, to the recording wire 4, the recording address circuit or sequencer 5 sequentially energizes the respective stages of the memory register under control of the clock circuit 7 so that the digits of the signal are successively recorded in respective register stages in place of the digit previously stored in each stage from the preceding signal.

Concurrently, the read-out address circuit or sequencer 6 is sequentially energizing the respective stages of the memory register under control of the clock circuit 7 so that each digit as recorded in said stages is emitted as a corresponding binary voltage value over wire 10 to shaper-amplifier 8 and thence, by way of decision circuit 9, to AND-gate 1.

In accordance with this invention, means not shown in FIG. 1 but later described in detail are provided whereby each of the digits read out by way of line 10 is derived from a register stage which is displaced or offset from the register stage into which an incoming signal digit is simultaneously being channeled by means of wire 4, by a prescribed number of positions in the direction of increasing digital positions. This amount of displacement or offset between the stages from which information is being read out and the stages into which information is being recorded at any particular instant may be any desired number $M<N$ of stages depending on the requirements of specific apparatus to which the invention is applied. In one highly useful application of the invention, the said number M of stages is selected to correspond with the inevitable known time lag involved in recording the incoming information in the memory. This log being due to the digitizing process and the circuit time constants. In a practical embodiment this time lag was determined as being substantially of 15 microseconds ; accordingly the displacement between the recording and reading circuits according to the invention was selected as two stages, and since in the embodiment referred to the spacing between adjacent pulse-code positions was about 8 microseconds, it will be seen that the read-out lead achieved by the invention in effect cancels out the recording time lag.

In other words, as each successive information digit of an incoming echo signal is applied from terminal $E_1$ to the left-hand or direct input of the gate 1, the lower or indirect input of the gate is simultaneously receiving the information digit from amplifier 8 (disregarding circuit 9) which was present in the immediately preceding echo signal at the same pulse code position as that of said information digit of the incoming echo signal. The AND-gate 1 will then produce an output if the corresponding position digits in both successive echo signals coincide, but not otherwise. Such a comparison of corresponding pulse positions in successive echo signals provides, as is well known, a means of retaining true echo signals while rejecting random or noise signals. However, it will be immediately evident that the invention has a great advantage over conventional systems of this type in that it makes it possible to perform such comparison directly with the incoming echo signals, and so to speak in real time, without requiring intermediate storage of the incoming signals as was heretofore necessary. The incoming signals as they appear (unless rejected) at the output S of the gate 1 are thus directly and immediately available for use. This not only achieves a very appreciable saving in time, improving the response rate of the radar system as a whole and hence the resolution, but has the further advantage of preserving the initial positional accuracy of the received code pulses, i.e. the precision of the distance measurement, as well as the accuracy in pulse width and even amplitude. It will be noted that the digitizing function performed by digitizer circuit 2 need only be relatively crude, since the comparison and decision functions performed by the system in gate 1 (and decision circuit 9 later referred to) are qualitative in character and will operate correctly even if the incoming information bits are recorded in the memory stages in roughly digitized form.

Still referring to FIG. 1, the use of the invention with a plurality of memory registers, such as the three shown in that FIG. rather than with a single register as so far discussed, will now be outlined. A typical—though not the sole—instance of use in which a plurality of memory registers would be required is the case, for example, of a secondary radar system operating to transmit in cyclic sequence a plurality of different types of coded interrogation signals capable of evoking automatic (or semi-automatic) response signals from transponder equipment carried by the interrogated aircraft. By way of example, the secondary radar system may be arranged to transmit cyclically a series of three or more different coded interrogation signals, a first one of which may question the craft as to its altitude, a second as to its flight velocity, and so on. The cyclically repetitive series of interrogation signals evokes from the craft transponder a corresponding, cyclically repetitive series of response signals coded to provide answers to the respective questions, and these response signals are received sequentially by the secondary radar system and appear at the input $E_1$ of the system of the invention.

In a system of this kind, it is evident that the comparison in coincidence gate 1 must be effected between signals of equivalent significance. If for example the secondary radar system is receiving an interleaved series of three different response signal trains, the incoming response signal pattern at $E_1$ can be represented as $I_0$, $J_0$, $K_0$, $I_1$, $J_1$, $K_1$, $I_2$, $J_2$, $K_2$, —. The signals such as $I_0$, $I_1$, $I_2$, —all have one significance (say "distance of the aircraft"); the signals such as $J_0$, $J_1$, $J_2$, — all have another common significance (say "aircraft altitude"), and the signals such as $K_0$, $K_1$, $K_2$, — all have a third common significance (say "aircraft flight velocity"). Comparison should then be effected between signals $I_0$ and $I_1$; signals $J_0$ and $J_1$; and signals $K_0$ and $K_1$; next, between signals $I_1$ and $I_2$; signals $J_1$ and $J_2$; and signals $K_1$ and $K_2$; and so forth. The provision of the plurality of memory registers 3 permits this type of operation.

Thus, let us assume as above a series of three interleaved response signal trains, and the provision as shown in FIG. 1 of three memory registers. Conventional means, later described, are provided whereby on reception of each signal at input $E_1$, concurrently with the recording of this signal in the first one of the three memory registers, the content of that register is transferred to the next or second register, and the content of the second register is transferred to the third register. With such an arrangement, it will be apparent that at any time the signal content of said third register is similar in type or significance to the incoming signal being received at the input $E_1$, and hence a proper comparison can be effected between the two signals at output coincidence gate 1. Otherwise stated, if the incoming signals are represented as above as $I_0$, $J_0$, $K_0$, $I_1$, $J_1$, $K_1$, $I_2$, $J_2$, $K_2$, — then during reception of signal $I_1$ at input $E_1$ the signal content of the third register is $I_0$, and the two signals can be compared bit by bit in output gate 1.

Another instance in which a plurality of memory registers is useful is where it is desired to compare more than two signals (say three) at a time. Consider for simplicity the case where all of the signals received at input $E_1$ are response signals of common type or significance, rather than forming a plurality of interleaved series as just considered above. It may be desirable for increased reliability, e.g. in "de-fruiting" or similar operations, to compare three consecutive response signals (rather than only two), and reject as spurious any bits in the incoming signal (or said incoming signal as a whole) in the absence of coincidence with bits at corresponding pulse-code positions in both preceding signals. For such a contingency two memory registers may be provided in the array designated 3 in FIG. 1. As in the instance last described, the content of the foremost one of the registers is transferred to the second register as the incoming signal is being recorded in said foremost register. Thus three signals are at all times simultaneously available for comparison in the system, one being the incoming signal at input $E_1$, and the other two being stored in the respective registers of the memory 3. The contents of both registers may be read out simultaneously, with the desired lead relative to recording as described in accordance with the invention, and applied to the logical circuit 9 (which in such case may constitute a simple coincidence gate), and the output of this circuit, if any, applied to the output coincidence gate 1 for comparison with the incoming signal. In this way the desired comparison between three consecutive signals is accomplished.

In the foregoing it was assumed that the read-out lead provided in accordance with the main feature of the invention was equivalent to the time lag intervening from the instant of reception of an incoming signal bit at input $E_1$ to the instant such bit has been effectively recorded in the memory. However, in certain highly advantageous aspects of the invention it is contemplated that a read-out lead may be applied which is substantially longer than such recording time lag. One example of such as application of the invention is the case where it is desired to determine the signal density surrounding a received echo signal, and generate a prescribed command signal should the signal density exceed a predetermined value. In such an application, the stored signals may be read out from the memory with a substantially greater amount of lead then the recording time lag, and applied to a conventional shift register (not shown). The logical decision circuit 9 would then be connected to the output of the shift register and would be so designed that it would decide whether or not to generate the aforesaid control signal according as the number of bits present in the shift register does or does not exceed a predetermined amount.

Practical embodiments of the invention will now be described in greater detail with reference to FIGS. 2–5. FIG. 2 illustrates in detail a simple embodiment of the invention associated with, say, a radar system providing a single train or series of similarly coded response signals, it being desired to compare the contents of only two successive signals.

Circuit components in FIG. 2 corresponding in function to components of FIG. 1 are similarly designated. Thus the system includes a first input $E_1$ for the received signals and a second input $E_2$ for synchronizing or keying pulses. FIG. **2*a*** represents the incoming response signals as they occur at input $E_1$ and travel (as indicated by arrow *f*) over the input wire both towards the direct input of gate 1 and through digitizer 2 to the memory. The signals as stated above from a single recurrent series or signal train and are designated $I_0$, $I_1$, $I_2$,— Each signal is shown as comprising eight code positions 1–8 each containing a binary information digit, i.e. N-8. Actually, as earlier stated, each signal may have 512 code positions. A keying pulse KP is shown as appearing ahead of the pulse position 1 of each signal, and this is the signal applied to synchronizing input $E_2$ for triggering off the clock circuit 7.

The memory 3 is here shown as comprising a single memory register including eight two-state elements in the form of forrite cores $3_1 - 3_8$. In practice there would be 512 cores in the case of the 512-bit signals referred to. A recording wire or lead 4 is threaded in series through all the cores of the register, and has one end connected to the output of digitizer 2 and its other end grounded. A read-out wire 10 is also threaded through all of the cores, and has one end grounded and its other end connected to the input of shaperamplifier 8 by way of an OR-circuit 90 discussed later. The output of amplifier 8 is shown directly connected to the lower or indirect input of AND-gate 1 whose output constitutes the system output S.

The recording address system generally designated 5 in FIG. 1 is here shown as comprising a multi-stage binary counter 50 followed by a binary matrix network 59. The counter 50 is shown with three stages since the register 3 has eight cores ($2^3$=8) but would include nine stages with the 512-bit memory register above referred to ($2^9$=512). The stages of counter 50 are connected to receive timing or shift pulses from clock circuit 7. Each counter stage has two (0 and 1) outputs connected to respective inputs of matrix 59, and this network has eight output lines 591 through 598. The operation of such a counter-and-matrix combination is well known. As shift pulses are applied in parallel to all three stages of counter 50, starting with the reception of a keying pulses KP at $E_2$ at the start of each received response signal, the counter stages (which are two-state elements) change states in such a sequence that the paired outputs of the counter stages indicate, by the over-all binary pattern of voltages carried by them, the sequence of numbers 1 – 8 (or rather 0 – 7) expressed in binary form. Each number indicated by the counter occurs at a time instant corresponding to that at which the correspondingly numbered pulse-code position in the signal is received. After the signal is over the counter remains idle in its initial state until triggered to start a new count by shift pulses initiated by the key pulse KP occurring on receipt of the next signal.

The matrix network 59 is a conventional logical circuit interconnecting the counter stage outputs with the eight matrix outputs 591 – 598 in such manner that said eight matrix outputs are energized one by one in the sequence just named, substantially in time with the changes of state of the counter stages. Thus line 591 is energized for the initial pulse position (1) of the signal e.g. $I_1$) being received at $E_1$, line 592 is energized for pulse position (2) and so on to line 598 energized for the last pulse position (herein 8) of the signal.

Matrix lines 591 through 598 are applied to respective recording gates 51 through 58. Each recording gate may be considered as constituting a two-input AND-gate having one input permanently energized from a source (indicated by + polarity) so as to generate an output voltage when its other input, provided by a related one of matrix output lines 591 – 598, is energized. The output from each recording gate is applied to a related record address wire 71 – 78 which is inductively threaded through a related core of the memory register 3 and has its opposite end grounded. The resulting recording arrangement operates in a well-known manner. As a response signal, e.g. $I_1$ comes in at $E_1$, the bits in its respective pulse positions are applied sequentially through digitizer 2 to recording wire 4, as either of two potential values, say zero volt for digit 0 and some prescribed fixed positive voltage level for digit 1. This fixed voltage level is so predetermined that when applied to the recording wire 4 it is per se unable to change the magnetization state of any of the cores. However, should the record address lead 71 – 78 of any one of the cores of the register be simultaneously energized by a voltage from the related recording gate 51 – 58 at a time recording device 4 is placed at said voltage levels, then the combined magnetic fields generated by both concurrently acting voltages is effective to change the state of magnetization of that core from its "zero" to its "one" state. It will thus be apparent that the application of a signal such as $I_1$ from input $E_1$ through digitizer 2 will result in the recording of the successive digits 1 – 8 of the signal as corresponding magnetic states of the respective cores $3_1 - 3_8$.

A read-out address system generally designated 6 as in FIG. 1 consists of a three-stage binary counter 60 and associated matrix network 69. The construction and operation of the read-out address device 60 – 69 is exactly similar to that of the recording address device 50 – 59, and it will be understood that during receipt of each response signal train the eight read-out-matrix output lines 691 – 698 are energized one by one in that order, at times corresponding to those of the pulse-code positions 1 – 8 of the signal. In fact a common counter-and-matrix unit may be provided to serve both the record-address and read-address sections.

The read-matrix output lines 691 – 698 are connected to the respective inputs of related read-out gates 61 – 68 similar to recording gates 51 – 58. The cores of the memory have respective read-out address wires or leads 81 – 88 inductively threaded through them, in a sense opposite that of the record address wires, and having each one end grounded. The read gates 61 – 68 have their outputs connected to the read address wires 81 – 88 in the following manner. Each read gate has its output connected to the read address wire threaded through the memory core displaced a prescribed number M of positions, herein two, in advance of that gate, in the direction of increasing pulse positions. That is, gate 61 has its output connected to read address wire 83 associated with core $3_3$; gate 62 has its output connected to wire 84 associated with core $3_4$; and so on. At the end of the series, gate 67 has its output connected to read address wire 81 threaded through core $3_1$ and gate 68 has its output connected to wire 82 through core $3_2$, thereby completing the permutation cycle.

The system as so far described operates as follows.

Consider the time interval when response signal $I_1$ is being received at input $E_1$, with its bits 1 through 8 being passed serially in that order both to the direct input of gate 1 and through digitizer 2 to record wire 4. At this time, as will presently be understood, the memory register 3 contains the digits of the previously received signal $I_0$ recorded as magnetic states of its respective cores.

As earlier explained, the sequential energization of record address wires 71 – 78 should cause the successive bits 1 – 8 of the incoming signal $I_1$ to be recorded in the respective cores $3_1 - 3_8$. However, owing to unavoidable delays due essentially to the digitizing process, a particular bit of the incoming signal $I_1$ is recorded in the related memory core only some time after said bit has appeared at $E_1$ and been passed to the direct input of gate 1, and it is here assumed that said delay corresponds to two elementary time periods or pulse positions of the signal.

Hence, at the instant (in real-time) that the bit 3 of incoming signal $I_1$ is being received at $E_1$ (this real-time instant being designated T3), record address wire 71 is energized so that bit 1 of the signal is recorded in core $3_1$.

At the same real-time instant T3, read address wire 83 is energized (owing to the offset pattern of connections described above) causing the information content of core $3_3$, i.e. bit 3 of previously recorded signal $I_0$, to be read out on read wire 10 and passed to shaper amplifier 8 to the indirect input of gate 1. The read-out of a 1-digit from a core resets the core to the 0-state.

It will thus be seen that digit 3 of the earlier signal $I_0$ is passed to output gate 1 simultaneously with the correspondingly positioned digit 3 of the incoming signal $I_1$, whereby the two digits can be effectively compared by the gate 1 without delay and said gate will produce a corresponding output at terminal S if both digits coincide, which output can be exploited immediately in external circuitry not shown.

The process just described in repeated at each successive real-time instant T3 through T8, during which the successive bits 3 through 8 of previous signal $I_0$ are passed in sequence to gate 1 to be there compared with the corresponding bits 3 through 8 of incoming signal $I_1$.

It will be observed however that with the arrangement as so far described the initial two information bits 1 and 2 of each signal would be lost, since no means have been described for passing said bits 1 and 2 of the signal $I_0$ recorded in the memory register to the output gate 1 during the first two real-time instants of each signal cycle, when the corresponding bits 1 and 2 of the incoming signal $I_1$ are being passed to said gate. To avoid this loss of information, the following information-restoring means are provided.

An AND-gate 27 has one input connected to the output of record gate 57 (or read gate 67) and its other input connected to read wire 10. The output from AND-gate 27 provides the setting input of a bistable flip-flop or binary 37, whose output supplies one input of an AND-gate 47 which has its other input connected to the clock circuit 7 so as to receive the initial clock pulses (C1) generated by it during each clock cycle. Binary 37 has a resetting input r connected e.g. to the output of record gate 51.

A similar combination, including AND-gate 28, binary 38 and AND-gate 48, is provided, the only difference with respect to the combination just described being that the second input of AND-gate 28 is connected to the output of record gate 58 (rather than 57) and that the second input of AND-gate 48 is connected to receive the second clock pulse C2 of each clock cycle (rather than pulse C1).

The outputs from both AND-gates 47 and 48 are united with the output from read wire 10 by means of OR-gate 90 and are applied to shaper-amplifier 8.

This arrangement operates as follows. At the real-time instant T9 which immediately follows the completion of an incoming signal (say $I_1$) received at $E_1$, there is no bit of said incoming signal being applied to the direct input of gate 1. However, record and read gates 57 and 67 are both energized. Energization of record gate 57 serves to record bit 7 of $I_1$ in core $3_7$ as earlier explained. Energization of read gate 67 serves to read out bit 1 of signal $I_1$, previously recorded at the beginning of the signal cycle being described (at real-time instant T3), and this bit is passed by wire 10 through amplifier 8 to output gate 1 where it serves no purpose since there is no bit being applied to the direct input of said gate. However, bit 1 of $I_1$ is simultaneously applied through AND-gate 27 which is active at this time owing to its connection with the output of record gate 57, now energized, to set the binary 37 (assuming said bit represented digit 1), whereby said bit is memorized or stored.

In an exactly similar manner, at real-time instant T10, bit No 2 of signal $I_1$ is read out of core $3_2$ and memorized or stored in binary 38.

At the real-time instant T1 of the next signal cycle, when the incoming signal at $E_1$ is $I_2$, clock circuit 7 applies a pulse C1 to AND-gate 47, thereby releasing the information memorized in binary 37 and applying it through OR-gate 90 and amplifier 8 to gate 1, where it is effectively compared with bit 1 of incoming signal $I_2$. In a similar manner, at real-time instant $T_2$ of the new signal cycle, bit 2 of signal $I_1$, memorized in binary 48, is released and applied through OR-gate 90 and amplifier 8 to output gate 1 for comparison with bit 2 of the incoming signal $I_2$. In this way the initial information of each signal cycle is restored and there is no loss of information in the system.

FIG. 3 illustrates another embodiment of the invention, involving that aspect thereof in which it is desired to compare three successive response signals, say $I_0$, $I_1$, $I_2$, of a single train of recurrent signals similar to that considered in the first embodiment and shown in FIG. 2a.

Parts of FIG. 3 similar to parts of FIG. 2 are similarly designated and will not be described anew, only the differences between the two embodiments being pointed out. It will be seen that the memory array 3 herein includes two registers 3a (having the cores $3a_1 - 3a_8$) and 3b (cores $3b_1 - 3b_8$). Register 3a has a first record wire 4a threading all its cores and connected at one end to digitizer 2 and at its other end to ground. Register 3a further has a first read wire 10a having one end grounded and its other end connected to a first shaper-amplifier 8a by way of an OR-gate 90a. Similarly, register 3b has a record wire 4b threading its cores and connected at one end to ground and at its other end to the output of OR-gate 90a by way of a two-bit time-delay circuit 40 and further has a second read wire 10b connected at one end to ground and at its other end through an OR-gate 90b to a second shaper-amplifier 8b. The outputs of both amplifiers 8a and 8b are applied to a decision circuit 9 (which may herein be reduced to a simple AND-gate as will later appear) whose output is applied to the indirect input of gate 1.

The record address wires 71a through 78a associated with the respective cores of register 3a are connected at one end the outputs of the related record gates 51 through 58 and at their other ends to the record address wires 71b through 78b, respectively, associated with the respectively corresponding cores of register 3b, the free ends of the latter address wires being grounded.

The read gates 61 – 68 have their outputs connected to the read address wires 81b – 88b associated with the respective cores of the second register 3b, in the offset relation shown, and as earlier described. That is, read gate 61 is connected with read address wire 83b, read gate 62 with address wire 84b, and so on, and finally read gate 67 is connected with address wire 84b, and read gate 68 is connected with address wire 82b. The free ends of the read address wires 81b through 88b are connected to respective ends of the read address wires 81a through 88a associated with the correspondingly positioned cores of the upper register 3a. The free ends of said upper read address wires are grounded.

The operation will be described considering the time interval when signal $I_2$ is being received at input $E_1$. At this time, as will presently appear, register 3a contains the previously received signal $I_1$ and register 3b contains the yet earlier received signal $I_0$ recorded therein.

At the real-time instant T3, when bit 3 of incoming signal $I_2$ is being received at $E_1$ and passed on to output gate 1, record and read gates 51 and 61 are energized, energizing record address wires 71a and 71b and read address wires 83a and 83b. Energization of record address wire 71a causes bit 1 of $I_2$ to be inscribed in core $3a_1$. Energization of read address wire 83a causes the content of core $3a_3$, namely bit 3 of previous signal $I_1$, to be read out from said core and transferred, two bit-times later (at real-time instant T5), into the corresponding second-register core $3b_3$.

To explain this transfer operation in somewhat greater detail, it is indicated that energization of read address wire 83a induces a voltage pulse in read wire 10a if core $3a_3$ is in a 1-state, and this pulse on wire 10a will appear with a two-bit delay, due to delay circuit 40, in the second record wire 4b. At this time (real-time instant T5) record address wire 73b will be energized and the energization of record address wire 73b will combine with the voltage pulse on wire 4b to place core $3b_3$ in its 1-state of magnetization.

Returning to the real-time instant T3, energization of read address wires 83a and 83b from read gate 61 (due to the offset or read-lead connections of the invention) causes the contents of both cores $3a_3$ and $3b_3$, i.e. bits 3 of the respective signals $I_1$ and $I_0$, to be simultaneously read out from said cores over wires 10a and 10b and applied through OR-gates 90a and 90b to shaper-amplifiers 8a and 8b and thence to respective inputs of decision circuit 9, which may be regarded here as a simple AND gate. If the two bits coincide, circuit 9 delivers an output corresponding to the common value of said bits and this output is applied to the indirect input of gate 1 where it is compared with bit 3 of incoming signal $I_2$ simultaneously applied to the direct input of said gate. Thus, gate 1 delivers an output corresponding to the common value of bits 3 of all three successive signals $I_0$, $I_1$, $I_2$ provided said bits coincide, and the output information can be immediately utilized in external circuitry connected to output line S.

The same process is repeated at each successive real-time instant T4 through T8, so that the successive bits 3 through 8 of previous signal $I_1$ and $I_0$ are serially passed in simultaneous pairs to decision circuit 9 and there compared with each other, the result of the comparison being in turn passed to gate 1 for comparison with the corresponding bit of incoming signal $I_2$.

To avoid loss of information at the start of a signal cycle, as explained with reference to FIG. 2, there is associated with each of the read lines 10a and 10b a logical information restoring circuit which is similar to the circuit described with reference to FIG. 2 as by including AND-gates 27 and 28, binaries 37 and 38, and AND-gates 47 and 48. In FIG. 3, the corresponding elements have been designated with the same references followed by suffix a for the restoring circuit associated with read line 10a and suffix b for the circuit associated with read line 10b. The operation of this part of the system can be summarized as follows.

At real-time instant T9, gates 57 and 67 are energized. Bit 7 of the signal $I_2$ (which signal has now traveled completely past input $E_1$ and AND-gate 1) is recorded in core $3a_7$. Bits 1 of signals $I_2$ and $I_1$, now respectively present in cores $3a_1$ and $3b_1$, are simultaneously read out over wires 10a and 10b and applied through AND-gates 27a and 27b to binaries 37a and 37b, respectively, in which they are memorized. Bit 7 of signal $I_1$, which was read out from core $3a_7$ two bit times earlier (at instant T7) and was retained in delay 40, is now transferred into core $3b_7$.

At real-time instant T10, similarly, bit 8 of $I_2$ is recorded in core $3a_8$, bits 2 of $I_2$ and $I_1$ are stored in binaries 38a and 38b, and bit 8 of $I_1$ is transferred into core $3b_2$.

At real-time instant T1 of the next signal cycle (incoming signal is $I_3$), application of clock pulse C1 to each of AND-gates 47a and 47b releases bit 1 of $I_2$ and bit 1 of $I_1$ from binaries 37a and 37b in which they were memorized and applies them by way of OR-gates 90a and 90b and amplifiers 8a and 8b to decision circuit 9 in which they are compared and the result of the comparison is applied to gate 1 for comparison with bit 1 of incoming signal $I_3$. Bit 1 of $I_2$ is also passed from OR-gate 90a into delay 40 in order to be transferred two bit times later (instant T3 of the $I_3$ cycle) into core $3b_1$.

At real-time instant T2 of this next $I_3$ signal cycle, in the same way, bits 2 of $I_2$ and $I_1$ are released from binaries 28*a* and 28*b* and applied to decision circuit 9 in which they are compared and the result of the comparison is applied to gate 1 for comparison with bit 2 of incoming signal $I_3$. Bit 2 of $I_2$ is also passed into delay 40 for subsequent transfer (at instant T4) into core $3b_2$.

Thus, loss of information is avoided. Binaries 37*a*, 37*b*, 38*a* and 38*b* are reset by a suitable time pulse applied to resetting inputs *r*, such as the output from gate 51 for example.

FIG. 4 illustrates an embodiment of the invention for use with received response signals constituting a plurality of interleaved trains of signals having different significance, as is commonly used in secondary radar or so-called IFF radar systems. It is here assumed, as shown in FIG. 4a, that there are three interleaved signal trains, designated I, J, K, but more could of course be used. The signals I, J and K, following one another in an invariable cyclic succession, constitute responses to different questions, and so cannot be compared with one another. As shown in FIG. 4*a*, the signals reach input $E_1$ in the sequence $I_1$, $J_1$, $K_1$, $I_2$, $J_2$, $K_2$, $I_3$, ..., and it is desired to compare signals $I_2$ and $I_1$, $J_2$ and $J_1$, $K_2$ and $K_1$, then compare signals $I_3$ and $I_2$, and so on.

In FIG. 4, the timing means including input $E_2$, clock generator 7, and counter-matrix combinations 5 and 6 have been omitted since they may be identical with the elements shown in FIGS. 2 and 3.

The system of the invention shown in FIG. 4 has three memory registers 3*a*, 3*b*, 3*c*. Each register is shown with eight cores $3a_1$ through $3a_8$, $3b_1$ through $3b_8$ and $3c_1$ through $3c_8$. Actually each register may include 512 cores in the case of 512-bit signals. Register 3*a* has a record wire 4*a* one end of which is connected to the output of digitizer 2 and whose other end is grounded, and has a read wire 10*a* with one end grounded and the other connected to one end of record wire 4*b* of register 3*b*, whose other end is grounded. Read wire 10*b* of register 3*b* has one end grounded and the other connected to record wire 4*c* of register 3*c*, whose other end is grounded. Rear wire 10*c* of register 3*c* has one end grounded and the other connected through shaper-amplifier 8 to the indirect input of gate 1.

The registers have record address wires 71*a* through 78*a*, 71*b* through 78*b*, and 71*c* through 78*c*, respectively. These wires are connected in series as between the corresponding cores of the respective registers. Thus the record address wires 71*a*, 71*b*, 71*c* for cores $3a_1$, $3b_1$ and $3c_1$ are connected in series and constitute in effect a single wire threaded through the three cores and having one end connected to the related record gate 51 and its other end grounded.

The registers have read address wires 81*a* through 88*a*, 81*b* through 88*b*, and 81*c* through 88*c*, respectively. These are connected with one another and with the outputs of read gates 61 through 68 in the following manner. Gate 61 has its output connected to the read address wire 83*c* of the third-register core $3c_3$ displaced a fixed number of (herein two) positions ahead of it in the direction of increasing code positions, and wire 83*c* is connected in series with the read address wires 81*b* and 81*c* of both first- and second-register cores $3b_1$ and $3a_1$ displaced rearward by the same number of positions from it, i.e., the cores corresponding in position with the read gate 61 considered. A similar connecting arrangement is provided in respect to the succeeding read gates as far as gate 66. Gate 67 has its output connected to the first-core read address wire 81*c* connected in series with read address wires 87*b* and 87*a* ; and gate 68 has its output connected to read address wire 82*c* connected in series with wires 88*b* and 88*a*, completing the permutation pattern. The free ends of the first-register read address wires 81*a* through 88*a* are all grounded.

In operation, consider the time period when signal $I_2$ is incoming at input $E_1$ with its bits 1 – 8 being passed in succession to digitizer 2 and to the direct input of gate 1. Memory registers 3*a*, 3*b* and 3*c* have recorded therein the information contents of previously received signals $K_1$, $J_1$ and $I_1$, respectively. Corresponding stages, such as cores $3a_1$, $3b_1$, $3c_1$, of these three registers are cascaded for the successive shifting of the respective digits of a stored signal from the first register 3*a* through the intermediate register 3*b* to the last register 3*c*.

At real-time instant T3, when bit 3 of signal $I_2$ is applied to input $E_1$, record and read gates 51 and 61 are energized, and bit 1 of signal $I_2$, delayed two pulse positions in digitizer 2, is applied to record wire 4*a*. Since gate 51 is energized, record address wire 71*a* is energized, and bit 1 of $I_2$ is consequently recorded in core $3a_1$.

Simultaneously read address wire 81*a* and record address wire 71*b* are energized, so that bit 1 of earlier signal $K_1$ is transferred from core $3a_1$ to core $3b_1$. Also, read address wire 81*b* and record address wire 71*c* are energized, transferring bit 1 of yet earlier signal $J_1$ from core $3b_1$ to core $3c_1$.

At the same real-time instant T3, energization of read address wire 83*c* effects read-out of bit 3 of the earliest signal $I_1$ from core $3c_3$ over wire 10*c* to shaper-amplifier 8 and thence to the indirect input of gate 1, where said bit is compared with the corresponding bit 3 of incoming signal $I_2$, applied at this time to the direct input of gate 1. Thus the desired comparison between signals $I_2$ and $I_1$ is effected bit by bit in gate 1, immediately on reception of signal $I_2$.

To prevent loss of information at the start of a signal cycle, logical information-restoring circuitry including a pair of AND-gates 27 and 28, a pair of binaries 37 and 38 and a pair of AND-gates 47 and 48 is associated with the read-out line 10*c*, and its components are connected similarly to the corresponding components of the embodiment of FIG. 2. This information-restoring arrangement operates in a manner generally similar to that previously explained. Briefly, it may be indicated that in this case at real-time instant T9 immediately following the completion of incoming signal $I_2$, record and read gates 57 and 67 are energized. Bit 7 of $I_2$ is recorded in core $3a_7$, bit 7 of $K_1$ is transferred from $3a_7$ to $3b_7$, bit 7 of $J_1$ is transferred from $3b_7$ to $3c_7$, and bit 1 of $J_1$ is read out from $3c_1$ and memorized in binary 37. Similarly at real-time instant T10 immediately following, bit 2 of $J_1$ is read out from $3c_2$ and memorized in binary 38.

At the real-time instant T1 of the next following signal cycle, which is the $J_2$ signal cycle, bit 1 of $J_1$ stored in binary 37 is applied from binary 37 by means of AND-gate 47 and through OR-gate 90 and amplifier 8 to the indirect input of gate 1, for comparison with the corresponding bit 1 of the incoming signal $J_2$. Similarly at the next real-time instant T2, bit 2 of $J_1$ is applied from binary 38 to gate 1 for comparison with the corresponding bit 2 of incoming signal $J_2$. Thus the information that would otherwise be lost is restored.

FIG. 5 partly illustrates an alternative arrangement of the record and read address means. The arrangement is shown for simplicity in conjunction with a single-register memory similar e.g., to the register 3 of FIG. 1. It will be seen that with each core $3_1$ through $3_8$ there is inductively associated a single record-and-read address wire, designated 101 through 108. Each such wire has its opposite ends connected to the outputs of respective two-input gates 111 through 118 and 121 through 128, respectively, and also has said ends connected to one input of a respective two-input gate 131 through 138 and 141 through 148, respectively. Gates 111 through 118 have one input connected to plus polarity and their second inputs connected to the related record-matrix output lines 591 through 598. Gates 141 through 148 have their second inputs connected to the same respective matrix output lines 591 through 598 and their outputs connected to ground.

Gates 121 through 128 have one input connected to plus polarity and their second inputs connected to the read-matrix output lines 691 through 698 in an offset pattern similar to that described in preceding embodiments. That is, the second input of third stage gate 123 is connected to read-matrix output line 691 ; the input of the fourth-stage gate (not shown) is connected to read matrix output line 692, and so on ; the inputs to the first two gates 121 and 122 are connected to read-matrix output lines 697 and 698, respectively.

Finally gates 131 through 138 have their second inputs connected to the same respective read-matrix output lines 691 through 698 as the related stage gates 121 through 128, and have their outputs grounded.

In this arrangement, energization of a record-matrix output line, say 591, enables both gates 111 and 141, whereby a positive voltage pulse is passed from plus polarity through gate 111, wire 101 and gate 141 to ground. Wire 101 thus has a current pulse flowing through it in one direction, selected to record in core $3_1$ the information bit currently applied to record wire 4.

Energization of a read matrix output line, say 697, enables both associated gates such as 121 and 131, whereby a positive voltage pulse is passed through wire 101 in the opposite direction, to read out the information bit recorded in the core into read wire 10 and simultaneously reset the core.

It will be apparent that the single-address-wire arrangement of FIG. 5 can readily be modified for use with the multi-register memory systems of FIGS. 3 and 4.

Many other departures from the embodiments shown and described may be made while remaining within the scope of the invention. Thus, the addressing means may be varied considerably and the interconnections between the address wires of respective memory registers may differ from those shown in any of the embodiments while still preserving the main teaching of the invention concerning the advanced read-out of information.

Embodiments of the invention generally similar to those shown in FIGS. 3 and 4 may be combined, as for permitting comparison between three (or more) consecutive signals of each of three (or more) interleaved signal trains.

It will be understood moreover that the circuits shown herein are somewhat oversimplified on account of to the fact that the number of two-state elements (such as ferrite cores) per memory register has had to be limited to only a few, herein eight, for obvious drafting reasons. In practice, the number of cores per register is large, e.g. 512 as earlier noted, and the (or each register is then usually designed in the form of a two-dimensional array or memory plane rather than the one-dimensional or linear array shown. In such case, it is convenient and conventional to employ two record address wires and two read address wires threaded through each core (in the embodiments of FIGS. 2, 3 and 4) or two record-and-read address wires through each core (in an embodiment such as that of FIG 5). These paired wires are then energized by way of suitable matrix networks to provide for the requisite addressing operations, as is well known in the art of digital memory devices. It will be obvious to those familiar with this art that the teachings of the invention disclosed herein can be very easily applied to two-dimensional memory devices employing addressing means of the kind just referred to.

As earlier indicated, the extent of positional displacement used according to the invention in the read-address-wire connections, and hence the time advance with which the reading process is performed with respect to the recording process, can be made greater than the lag inherent in the recording action by reason of the digitizing operations and other causes. By making the read lead greater than the recording lag, it becomes possible to cause a decision circuit such as 9 to reach a decision, in response to the information content of a previously recorded signal in the memory, before the corresponding information of the currently incoming signal has been received. For example, in radar word it is sometimes desirable to determine the signal density surrounding an echo signal and effect a control action should such density exceed a prescribed value. In such case, the information read out from a memory register with an advance greater than the recording time lag may be passed to the input of a stepping register (not shown) and the amount of information contained in said register may be considered an advance measurement of the desired signal density whereupon an anticipatory command signal may be generated by said register should the amount of information present in it exceed a prescribed threshold.

Various other uses of the invention will occur to those familiar with the art, and the appropriate amount of read-out lead and other specific parameters as well as the appropriate circuit arrangements may be readily designed accordingly.

I claim:

In a radar receiver the improvement comprising:

timing means defining a number N of consecutive and sequential intervals for each period of operation of the receiver;

a memory means having at least N positions;

input means actuated by the timing means, said input means serving to render receptive to the presence of an input signal a separate one of the storage means positions for each of the N intervals whereby for each interval in sequence there is recorded in a corresponding position of the storage means the presence or absence of an input signal occurring during that interval;

output means actuated by the timing means in synchronization with said input means, said output means receiving the input signal and functioning to permit passage to the receiver output of any input signal occurring during an interval of a period only if the presence of an input signal for the corresponding interval of the last preceding period is shown by a signal from the appropriate position of the storage means.

* * * * *